March 13, 1928.

R. W. ROGERS 1,662,130

POWER TRANSMISSION GEARING

Filed May 3, 1926   3 Sheets-Sheet 1

INVENTOR
Ralph W. Rogers

March 13, 1928.
R. W. ROGERS
1,662,130
POWER TRANSMISSION GEARING
Filed May 3, 1926
3 Sheets-Sheet 2
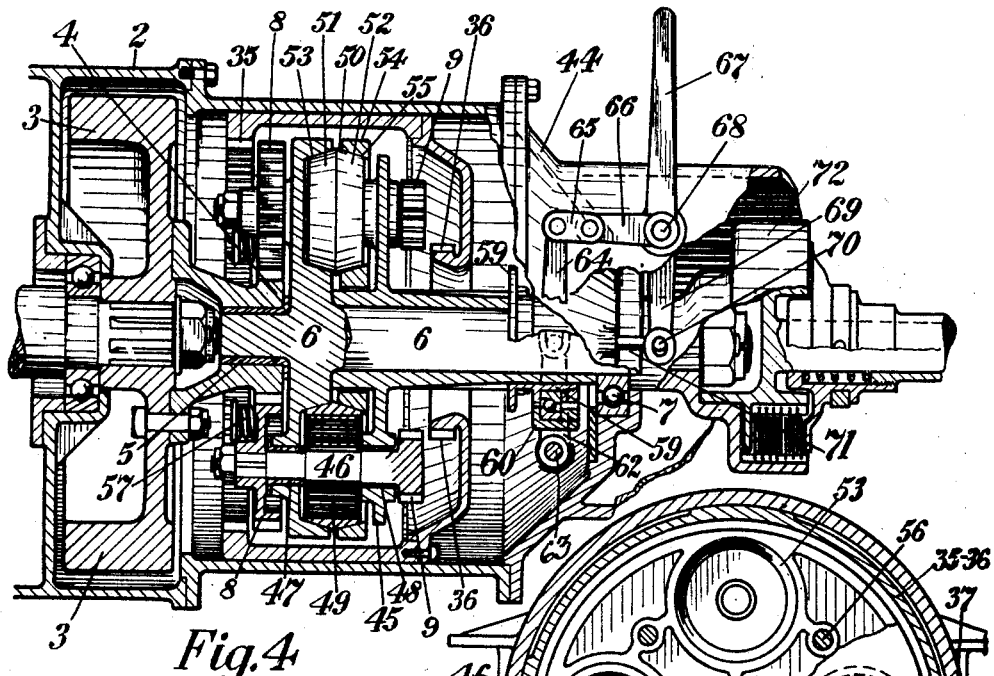
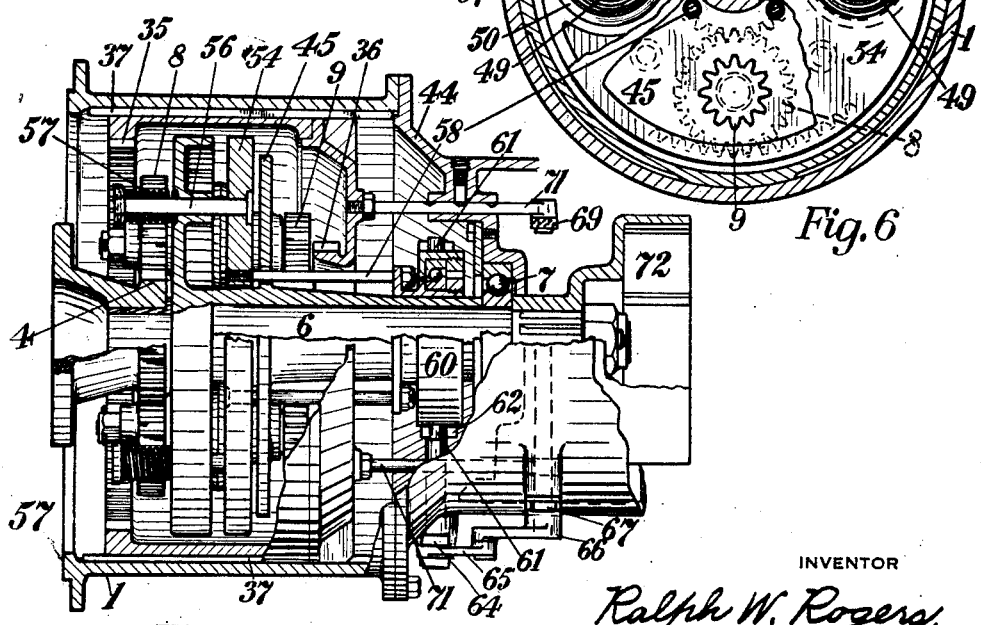
INVENTOR
Ralph W. Rogers.

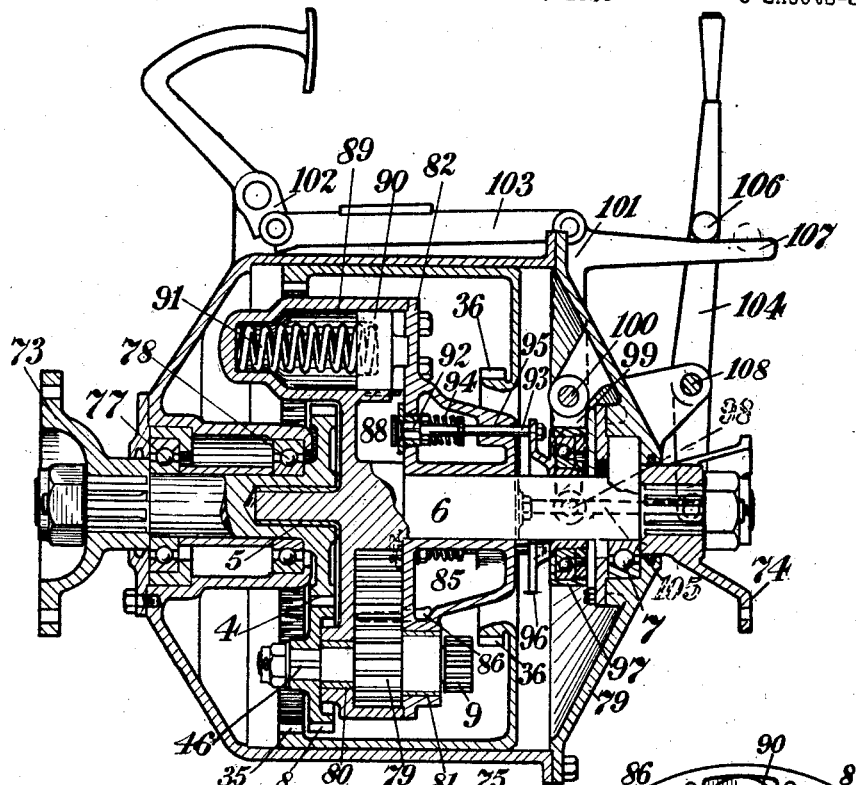
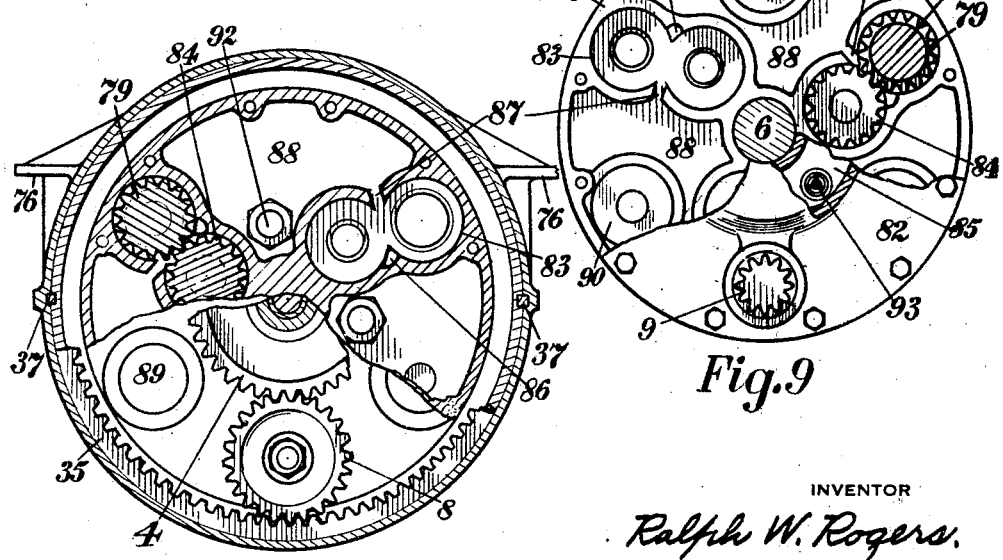

Patented Mar. 13, 1928.

1,662,130

UNITED STATES PATENT OFFICE.

RALPH W. ROGERS, OF FRANKLIN, PENNSYLVANIA.

POWER TRANSMISSION GEARING.

Application filed May 3, 1926. Serial No. 106,370.

The present invention relates to certain new and useful improvements in the means for transmitting power from a prime mover to a driven member, under both starting and running conditions, when, the prime mover running, the load must be put in motion and accelerated to running speed.

As is well known the internal combustion engine is not able to deliver power at less than a definite speed of the crank shaft and is not adapted to starting under load. The engine started and running at speed, the load must be put in motion and accelerated. By the common method of easing in a clutch to connect the engine with its load the force of such rapid acceleration is correspondingly great, setting up strains causing shock and often stalling the engine or motor.

An electric motor of the squirrel cage induction type must start and instantaneously accelerate to speed with consequent large accelerating force for any load. The flexible feature of my transmission allows a comparatively slow acceleration of the load, eliminating the shock of instantaneous acceleration, and enabling the motor to start its load from rest.

The present invention is particularly useful and advantageous as an automobile transmission. In traffic congestions, in stop and go lanes of traffic, it is highly desirable to eliminate shifting of gears, allowing the driver to use hands for steering only, with his attention concentrated on the road, traffic and signals. By the use of this invention a rapid, automatic acceleration is accomplished without gear shifts.

The object of my invention is to provide a means whereby a prime mover, such as a gas engine, induction motor, or any driving member rotating at a definite speed may start in motion and automatically accelerate at a more or less constant rate, the speed of a member to be driven, thereby eliminating excessive forces, strains and shock and the stalling of the motor or engine, and at full speed to drive direct with no intermediate gears, idling gears or secondary shaft; to provide in addition a slow speed, also a reverse; i. e., means for changing speed and for driving in the opposite direction.

My invention is illustrated by the accompanying drawings. Figure 1 is a sectional view on a vertical axial plane. Figure 2 is a sectional view on a horizontal axial plane. Figure 3 shows partial sections as cut by planes perpendicular to the axis, parts being broken away.

As adapted for use as an automobile transmission, the transmission housing or case 1, is shown bolted to the bell housing 2 of a motor or gasolene engine. Keyed or splined to disc 3 of the fly-wheel clutch, is pinion 4. Pinion 4 is rotatably mounted on a central shaft member or spider 6, which spider 6 is supported in bearing 5, in the fly-wheel and in bearing 7, mounted in end of housing 1. Meshing with pinion 4 are planetary gears 8, 8, 8, each of which gears 8, integral with gears 9 and 10, form a triple gear 11, of which there can be any practical number—in the present instance three are shown used.

Triple gears 11, 11, 11, are carried in bushings 12, 12, 12, pressed in the disc or flange part of spider 6, which spider 6 being rotatable in bearings 5 and 7 can carry triple gears 11 rotatively and concentrically around its axis. In mesh with gears 10, 10, 10, is gear 13, which is rotatably mounted on turned part of spider 6. Pinion 4 is always in mesh with gears 8 and gear 13 is always in mesh with gears 10, a combination commonly known as planetary gearing.

Between gear 13 and clutch case 18, is clutch 14. Any form of clutch may be used. In the present instance is shown a common form of multiple disc friction clutch 14, of which the inner driving member is the extended hub of gear 13, carrying keys 15 and the friction discs 16, which alternate with discs 17. Discs 17 drive clutch cage 18 through keys 19.

Springs 20, 20, 20, pressing on ring 21, all carried by cage 18, press the friction discs 16 and 17 together and the clutch is engaged or drives. Clutch 14 may be operated by the commonly used method employing sleeve, clutch ring, yoke, and levers. Pins 22, 22, 22, riveted in pressure ring 21, are connected to sleeve 23, which is slidable on spider 6. Rotatably mounted on sleeve 23, is ring 24 having trunnions 25, 25. Engaging trunnions 25 is yoke 26, carried by shaft 27. On shaft 27 is keyed lever 28, to which is connected link 29. Link 29 forms a toggle with link 30. One end of link 30 is pivoted to housing 1, the other end is connected by a common pin to both link 29 and the upper end of link 31. The lower end of link 31, is connected to arm 32 of lever 33, which lever 33 is rotatably mounted on shaft 27. If lever 33 is moved to the right or left, its bellcrank arm 32 is moved down or up respectively, and link 31 acting at the middle of the toggle, 29—30, causes lever 28 to move, together with shaft 27 and yoke 26, thus releasing clutch 14.

To the outside of clutch cage 18 is rigidly attached one end of spring 34 the other end of spring 34 is attached to the rim part of spider 6. The end of spring 34 attached to clutch cage 18, is connected to gear 13, by clutch 14, when lever 33 is in the neutral position shown and spring 34 is disconnected from gear 13 by clutch 14, when lever 33 is moved in either direction.

When flywheel clutch engages disc 3, pinion 4 drives triple gears 11, 11, 11, and gear 13. Gear 13, by clutch 14, is connected to, and tends to wind up spring 34. Spring 34 is already under initial stress by reason of its length and form for its space. As the other end of spring 34 is connected to spider 6, said spider 6 tends to rotate about its axis in the direction of the driving pinion 4. As spring 34 winds up, spider 6 is thus put in motion and accelerated, the speed of spider 6 approaches the speed of pinion 4 and the force of acceleration reduces. When the speed of spider 6 becomes equal to the speed of pinion 4, the force of driving is balanced by the force of spring 34, there is no rotation of gear 13 relative to spider 6, and no rotation of planetary gears 11, 11, 11, relative to spider 6, the teeth of gears 8, 8, 8, acting as keys and pinion 4 drives spider 6 at synchronous speed. The whole set then revolves as a unit in direct drive with no idling gears or secondary shafts.

Thus a flexible connection is made between a rotating driving shaft and one to be driven which automatically causes the driven shaft to be gradually accelerated and driven at the speed of the driving member.

An annular gear 35, integral with gear 36, forming a compound gear 35—36, is fitted to slide in housing 1 on feather keys 37, 37. Compound gear 35—36 as shown is in neutral position and may be shifted—annular gear 35 into mesh with pinions 8, 8, 8, or reverse gear 36, into mesh with pinions 9, 9, 9, clutch 14 being disengaged. Lugs 38, attached to compound gear 35—36, are connected by links 39 to yoke 40, carried on shaft 41. Shaft 41 is operated by lever 33, through link 42 and arm 43.

Moving lever 33 to the left, in Figure 1, moves annular gear 35 into mesh with pinions 8 which pinions are constantly in mesh with pinion 4. Pinion 4 being driven, the planetary motion of gears 8 meshing with stationary annular gear 35, causes spider 6 to be driven at low speed. Moving lever 33 from neutral position of Figure 1 to the right, slides the compound gear 35—36 so that gear 36 meshes with pinions 9, 9, 9, which are integral with pinions 8, 8, 8. Pinion 4 driving, the rotation of pinions 9, in mesh with stationary gear 36 causes spider 6 to be driven in the opposite direction from that of pinion 4. In every case, spider 6 being driven, delivers power to the coupling flange 6' shown splined to spider 6.

Thus in a transmission as applied to a vehicle drive there is provided flexibility on the direct drive by which flexibility, acceleration of the load is gradual and automatic; and there is provided a low speed and also a reverse.

An alternate construction to that shown by Figures 1, 2, and 3, is illustrated by Figures 4, 5, and 6, on the second sheet of the accompanying drawings.

Figure 4 is a sectional view on the vertical plane through the axis or shaft of the transmission.

Figure 5 is a sectional view on the horizontal plane through the axis.

Figure 6 shows partial sections on planes perpendicular to the axis, parts being broken away.

Figures 1, 2, 3:
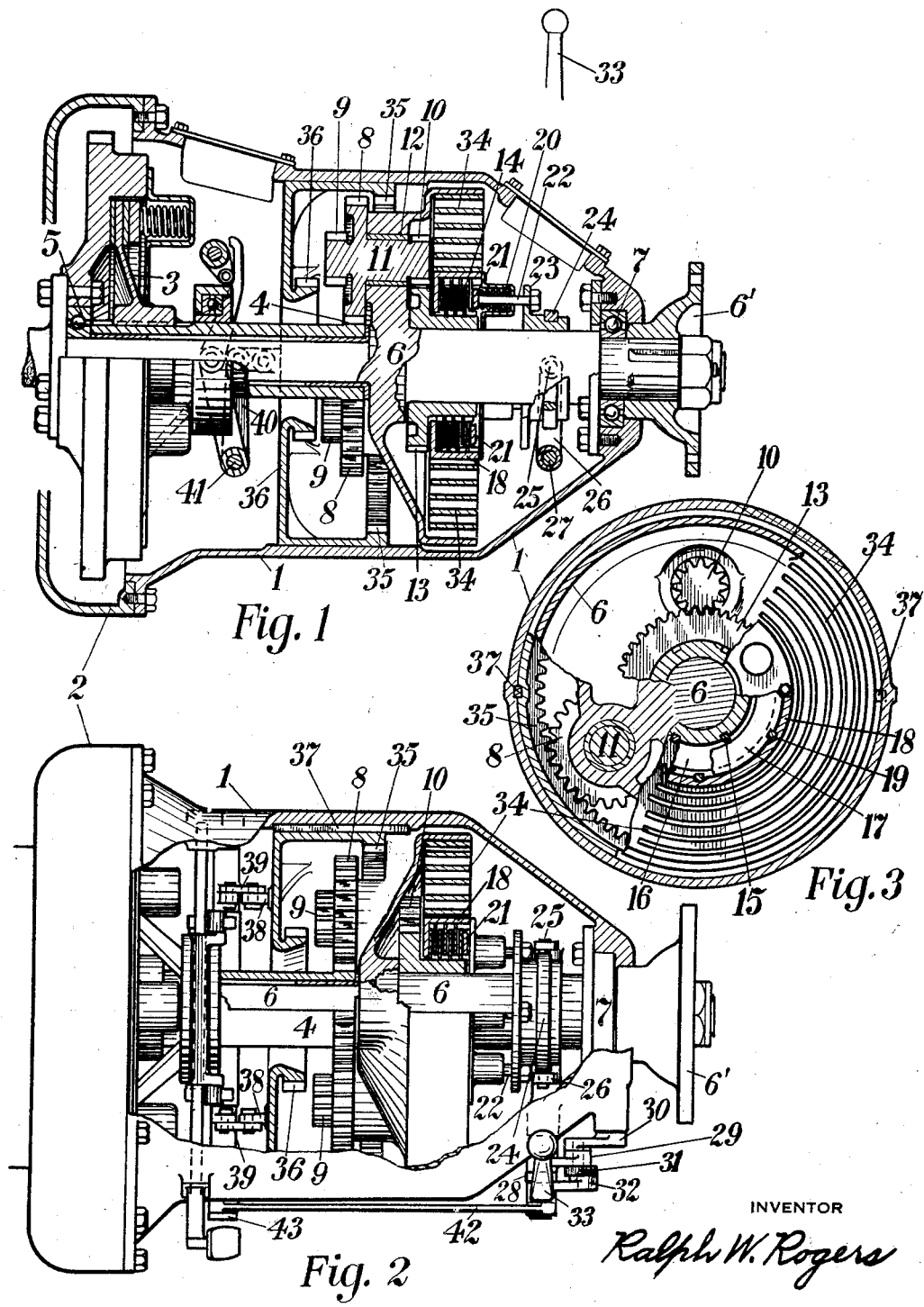

As in the previous figures, here is shown the transmission case 1, attached to the bell housing 2, of an internal combustion engine. Rigidly attached to the fly-wheel 3 and adapted to be driven by said fly-wheel, is pinion 4. Bushing 5 in pinion 4 forms one bearing for spider 6, the other bearing 7 being mounted in end bell 44 of housing 1. Keyed or pressed on spider 6, is flange or disc 45, which combination of spider 6 and flange 45 are equivalent to one integral body—a double flanged spider rotatably mounted in bearings 5 and 7. In mesh with pinion 4 are planetary gears 8, 8, 8, 8,—in the present instance four are employed,—each of which gears 8 are splined to shaft 46 which shaft is integral with gear 9. Gears 8 and 9 thus form a compound gear. Shafts 46 are carried by spider 6 in bearings 47 and by disc 45 in bearings 48.

Attached to each shaft 46 is one end of spring 49 of suitable form. The other end of each spring 49 is attached to spring ring or case 50. The surface of each spring case 50 is a double cone friction surface, 51, 52. In the disc or flange of spider 6 are cone surfaces 53 corresponding to, and fitting each cone surface 51. In clutch pressure plate 54 are cone surfaces 55, corresponding to, and fitted to grip with, friction surface 52 of each spring case, 50. Rigidly connected to pressure plate 54 are pins 56, 56, 56, which extend through holes in flange of spider 6 and carry springs 57, 57, 57, under suitable compression against flange of spider 6. Springs 57, tend to draw pressure plate towards spider flange and bring into contact, friction surfaces 51 with 53, and 52 with 55—a clutch action which, with sufficient compression of springs 57, does not permit rotation of spring case 50 relative to spider 6.

Pins 58, 58, rigidly fasten pressure plate 54 to sleeve 59 which is slidable on spider 6, by which sliding motion pressure plate 54 may be drawn away from, and out of contact with spring cases 50, allowing spring cases 50 together with the contained springs 49 and attached shafts 46, and pinions 8 to revolve freely or idle in bearings 47 and 48. On sleeve 59 is rotatably mounted ring 60, carrying trunnions 61. Engaging trunnions 61 is yoke 62 with fulcrum 63 and arms 64. Toggle link 65 connects yoke arm 64 with arm 66 of lever 67 carried by shaft 68. Operated also by lever 67 are arms 69, 69, engaging pins 70, 70, in the ends of rods 71, 71. Rods 71 extend through guides in end bell 44 and are rigidly attached to reverse gear 36 which gear 36 is bolted to annular gear 35, forming a compound gear 35—36. Compound gear 35—36 is fitted to slide in the bored housing 1 on feather keys 37, 37. To spider 6 is splined or keyed the clutch body 72 which may be any type of clutch operated in any manner but having a toggle or cam to lock clutch in the open or disengaged position. In Figure 4 lever 67 is in neutral position and springs 57 hold pressure plate 54 to lock spring cases 50. With clutch 72 disengaged and lever 67 in neutral, the engine, running, will drive the transmission as a unit, planetary gears 8 being held by the initial force of springs 49, the teeth of planetary gears acting as keys with the teeth of pinion 4. When clutch 72 is engaged throwing load on spider 6, the greater pressure between the teeth of pinion 4 and planetary gears 8, causes springs 49 to wind up, with consequent rotation of pinions 8, 8, 8, 8 relative to spider 6 and the slower motion of spider 6 which picks up the load gradually and without shock. As the load is accelerated the driving torque and the force of the springs 49 maintain a balance, the pinion 4 driving the transmission as a unit in direct drive with no idling gears or secondary shafts.

When lever 67 of Figure 4 is moved to the left in that view, inter-connecting toggle link 65, through yoke arm 64, shaft 63, yoke 62, trunnion ring 60, sleeve 59 and pins 58 pulls pressure plate 54 away from contact with spring cases 50 and releases planetary gears 8, to free an idle rotation in bearings 47 and 48. The movement of lever 67 to the left also causes arms 69 to move compound gear 35—36 to the right so that keyed annular gear 35 meshes with planetary pinions 8, 8, 8, 8, causing pinion 4 to drive spider 6 at low speed.

When lever 67 is moved to the right in Figure 4, toggle link 65 in the same way as before releases the planetary gears, and compound gear 35—36 is moved to the left so that gear 36 is in mesh with gears 9, 9, 9, 9, causing pinion 4 to drive spider 6 in a direction opposite to that of pinion 4.

To show that this invention need not be confined to any one construction, and that it may be made in various forms, I submit a third drawing illustrating by Figures 7, 8, and 9 another alternate construction.

Figure 7 is a vertical sectional view on a plane through the axis.

Figure 8 is made up of partial sections on planes perpendicular to the axis looking at the left end of Figure 7 toward the right.

Figure 9 shows partial sections of the rotor members only on planes perpendicular to the axis looking at the right end of Figure 7 toward the left and omitting the housing.

As shown in Figure 7, the transmission is adapted to be driven by any prime mover or driving member attached to flange 73, and in turn deliver power or drives through coupling 74. The transmission housing 75 may be independently mounted on a frame or beam members by means of feet or bearing pads 76. The extended hub or shaft of pinion 4 on which is splined or keyed coupling flange 73, is carried in bearings 77 and 78. Bearings 77 and 78 are mounted in the end bell of housing 75. In pinion 4 is bushing 5 which forms one bearing of spider 6, which has also bearing 7 mounted in end plate 79. Meshing with pinion 4 are planetary gears 8, 8, 8—in the present instance, three are employed—each of which gears 8 is keyed to shaft 46. Each shaft 46 is integral with reverse pinions 9 and pump gear 79, the combination of gears 8, 9, and 79 forming a triple gear, which triple gears are suitably mounted in bearings 80 in flange of spider 6, and in bearings 81 in spider cover plate 82, bolted to spider 6. On flange of spider 6 are formed pump chambers 83, 83, 83, in which are pump gears 79 and meshing gears 84. When the pump gears 79 and 84 revolve, oil or fluid is received through ports 86 from reservoir space 85, formed on cover 82, and is delivered through ports 87 to pressure space 88. Integral with flange of spider 6 are cylinders 89, fitted with plungers 90 and springs 91. In cover plate 82 are valves 92 controlling release of oil or fluid from pressure space 88 to reservoir space 85. Bearing on collars on valve stems 93 are valve springs 94. Valve stems 93 which extend through bearings 95 in the wall of reservoir space 85, are rigidly connected to sliding sleeve 96. Rotatably mounted on sleeve 96 is ring 97, carrying trunnions 98. Engaging trunnions 98 is yoke 99, carried by shaft 100. On shaft 100, is keyed lever 101, which lever is connected to toggle lever 102 by link 103.

Compound gear 35—36 is slidable in housing 75 on feather keys 37, by means of lever 104 and connecting rods 105 which pass through bearings in end of housing. On lever 104 is pin or roller 106 which in contact with arm 107 of lever 101 operates shaft 100, yoke 99, ring 97, sleeve 96, and opens valves 92, when lever 104 is moved in either direction to shift into low speed or reverse gear.

Pinion 4, being driven by prime mover connected to coupling flange 73, when lever 102, is depressed to the over the center or toggle lock position, lever 101 is moved to the right in Figure 7, sleeve 96 and valve stems 93 are moved to the left so that the valves 92 are opened allowing free circulation of oil or liquid and free rotation of pump gear 79 and planetary gears 8 and 9. In this position of lever 102 the triple planetary gears 8, 9, and 79, revolve idly in bearings 80 and 81 and no power is transmitted.

When lever 102 is moved to the out of lock or released position, springs 94 close valves 92 and, pinion 4 driving, the pump gears 79 and 84 revolve, taking oil from reservoir space 85 and pressure builds up in the pressure space 88 tending to force back plungers 90 against springs 91. With increasing resistance on pump gears 79 and 84 the force reaction on bearings 80 and 81 sets up rotation of spider 6 and flange 74. When the pressure in space 88 is sufficient to lock the pump gears 79 and 84 against rotation on axis of shaft 46, rotation of gears 79 and 8 is stopped relative to spider 6 in which case pinion 4 driving, the transmission revolves as a unit, keyed by the locked teeth to pinion 4.

The low speed and reverse compound gear 35—36 is shifted in the manner hereinbefore explained by moving lever 104 in the proper direction by which motion, valves 92 are opened by a roller 106 in contact with arm 107 operating through yoke sleeve and valve stems, and allowing the planetary gears free rotation relative to spider 6.

I claim:

1. In a power transmission unit, the combination of a gear member rotatably mounted and adapted to be driven or to drive, a plurality of mating gears comprising a set of planetary gears meshing with said gear member, each mating planetary gear rotatably mounted in a carrying body, said carrying body rotatably mounted co-axially with the said gear member and adapted to be connected to a driven or a driving member, in the said carrying body co-axial with each gear of the set of planetary mating gears a clutch friction surface, a plurality of friction rings each ring adapted to contact with one of the clutch friction surfaces of the carrying body, a pressure plate, on each friction ring additional friction surfaces adapted to contact with one of a plurality of friction surfaces formed in the pressure plate, a plurality of springs each spring having one end attached to one of the said friction rings its other end attached to the planetary mating gear with which the friction ring is co-axial so that rotation of the planetary mating gear relative to the friction ring winds up or unwinds the spring, the pressure plate slidably mounted on said carrying body, in said pressure plate a plurality of clutch friction surfaces adapted to contact with said additional friction surface of the said friction rings, a plurality of springs one end of each spring attached to or acting against the carrying body the other end of each spring attached to or acting against the pressure plate thereby causing all friction surfaces to contact under pressure of the springs and setting up resistance to rotation of the spring rings relative to the carrying body and pressure plate, links attached at one end to said pressure plate the other end attached to a sliding sleeve, said sliding sleeve having a common axis with said carrying body, a yoke rotatably mounted on and concentric with said sliding sleeve, trunnions on said yoke, a forked lever, the forked end fitted to the trunnions of the yoke and a fulcrum for said lever, by which lever said pressure plate may be held out of contact with said spring rings.

2. In a transmission, the combination of a mating pinion, adapted to be driven, a cluster of planetary gears each of which is a compound gear, a spider carrying said gears, and adapted to drive, a compound gear keyed against rotation but slidable into and out of mesh with the planetary compound gears, giving a forward and reverse direction of rotation to the carrying spider.

3. In a transmission, the combination of a driven pinion, a set of planetary gears each of which is a compound gear, a body carrying the planetary gears and adapted to drive, a means for limiting and controlling the rotation of the compound planetary gears relative to the carrying body, giving a controlled variable speed between pinion and driving carrying body, an annular gear integral with a spur gear forming a compound gear, said compound gear keyed against rotation but slidable into and out of mesh—the annular gear with one set of the compound planetary gears, the spur gear with the other set of the compound planetary gears—the gears so spaced that when the one is in mesh the other is out of mesh, with neutral position in which neither is in mesh.

4. In a power transmission, the combination of a driving pinion, a set of planetary gears meshing with said pinion; a carrying body rotatably mounted coaxial with said pinion; said planetary gears rotatably mounted in said carrying body; a compound gear consisting of an annular gear and a spur gear, said compound gear adapted to mesh with said planetary gears, the annular and spur gears so spaced that when one is in mesh with said planetary gears, the other is not in mesh, and with a space so that neither the annular part nor the spur part of said compound gear is in mesh; said compound gear slidable into mesh and out of mesh but keyed against rotation, the annular gear in mesh giving to said carrying body a direction of motion the same as said driving pinion, the spur gear in mesh giving to said carrying body a direction of motion opposite to that of said pinion.

5. A structure as specified in claim 1 together with an additional gear keyed to or integral with each of the planetary mating gears forming with each a compound gear rotatably mounted in the carrying body, two gears co-axial with the carrying body, said two gears keyed against rotation in a supporting housing and slidable into mesh one with the said additional gears and when in mesh causing the carrying body to have a rotation opposite to that of the gear member, the other gear slidable into mesh with the teeth of the compound planetary gears on the opposite side of the axis of the compound planetary gears and when in mesh causes the carrying body to have a rotation at a speed different from the speed of the said gear member, the said two gears attached to or integral with one another and so spaced that when one is in mesh the other is out of mesh and with a neutral position in which neither is in mesh, means for sliding said two gears into and out of mesh and for moving said pressure plate out of contact when either the one gear or the other gear is moved into mesh.

6. A structure as specified in claim 1 with the set of friction rings rigidly attached to or integral with the set of planetary mating gears each to each without intermediate springs.

RALPH W. ROGERS.